US00RE41502E

(19) United States
(12) Reissued Patent
Neaux

(10) Patent Number: US RE41,502 E
(45) Date of Reissued Patent: Aug. 17, 2010

(54) FLUSH CLOSURE DEVICE FOR AN OPENING IN BODYWORK

(75) Inventor: Jean-Claude Neaux, Terves (FR)

(73) Assignee: Advanced Comfort Systems France SAS-ACS (FR)

(21) Appl. No.: 11/780,028

(22) Filed: Jul. 19, 2007

Related U.S. Patent Documents

Reissue of:
(64) Patent No.: 5,809,706
Issued: Sep. 22, 1998
Appl. No.: 08/760,901
Filed: Dec. 6, 1996

(30) Foreign Application Priority Data

Dec. 8, 1995 (FR) ..... 95 14566

(51) Int. Cl.
*E06B 3/32* (2006.01)
*E06B 3/46* (2006.01)

(52) U.S. Cl. ..... 52/204.51; 52/204.597; 52/208; 49/489.1; 49/374; 296/84.1; 296/86; 296/88; 296/92

(58) Field of Classification Search ..... 52/204.51, 52/208, 204.597, 204.595; 296/190.1, 190.11, 296/146.16, 86, 88, 92, 89, 84.1; 49/390, 49/413, 149, 176, 177, 141, 489.1, 374
See application file for complete search history.

(56) References Cited

U.S. PATENT DOCUMENTS

| | | | | | |
|---|---|---|---|---|---|
| 1,721,223 | A | * | 7/1929 | Kern | 49/48 |
| 1,809,132 | A | | 11/1931 | Martin | |
| 2,282,980 | A | | 4/1942 | Guy | |
| 2,701,162 | A | | 2/1955 | Kliger | |
| 2,721,361 | A | | 10/1955 | Ryan et al. | |
| 2,721,636 | A | | 10/1955 | Ordorica et al. | |
| 2,894,784 | A | | 7/1959 | Howard | |
| 2,946,098 | A | | 7/1960 | Migneault et al. | |
| 3,321,234 | A | | 5/1967 | Harrell et al. | |
| 4,124,054 | A | * | 11/1978 | Spretnjak | 160/90 |
| 4,571,278 | A | * | 2/1986 | Kunert | 156/108 |
| 4,850,139 | A | | 7/1989 | Tiesler | |
| 4,888,915 | A | * | 12/1989 | Goldenberg | 49/181 |
| 5,065,544 | A | * | 11/1991 | Martin | 49/177 |
| 5,228,740 | A | * | 7/1993 | Saltzman | 296/146.1 |
| 5,467,557 | A | * | 11/1995 | Jones | 49/171 |
| 5,522,191 | A | * | 6/1996 | Wenner et al. | 52/204.51 |
| 5,551,197 | A | | 9/1996 | Repp et al. | |
| 5,613,323 | A | * | 3/1997 | Buening | 49/380 |

FOREIGN PATENT DOCUMENTS

| | | |
|---|---|---|
| BE | 358158 | 2/1929 |
| DE | 3118559 | 11/1982 |
| EP | 0037097 | 3/1981 |
| EP | 0449372 | 10/1991 |
| EP | 0646483 | 9/1994 |
| FR | 2552483 | 3/1985 |
| GB | 1 332 212 | 10/1973 |

* cited by examiner

*Primary Examiner*—Brian E Glessner
*Assistant Examiner*—Adriana Figueroa
(74) *Attorney, Agent, or Firm*—Shewchuk IP Services, LLC; Jeffrey D. Shewchuk

(57) ABSTRACT

A device for closing an opening formed through the bodywork of a vehicle, the device comprising a fixed panel and a panel that constitutes a moving panel relative to the fixed panel, the moving panel being connected to the fixed panel by functional elements providing the required mobility, the functional elements being fitted to the face of the fixed panel that is directed towards the inside of the vehicle.

22 Claims, 1 Drawing Sheet

FLUSH CLOSURE DEVICE FOR AN OPENING IN BODYWORK

Matter enclosed in heavy brackets [ ] appears in the original patent but forms no part of this reissue specification; matter printed in italics indicates the additions made by reissue.

The present invention relates to a flush closure device for an opening in bodywork.

BACKGROUND OF THE INVENTION

The best-known method of placing window glass in an opening of a vehicle such as a car, a bus, a truck, or even a rail vehicle, consists in providing a frame for connecting the window glass to the edges of the opening, the frame having an inside portion and an outside portion that are urged towards each other to grip simultaneously the edges both of the window glass and of the opening, via a sealing gasket.

Since taste concerning appearance has changed, the present trend is to eliminate if not the presence then at least the visual impression of an interruption that such a frame would generate, so that the window glass appears to be a transparent portion of the bodywork without any gaps therebetween.

OBJECT AND SUMMARY OF THE INVENTION

The present invention proposes a solution for closing an opening in a vehicle with a flush panel that is provided with a moving portion for performing a ventilation function.

To this end, the invention provides a device for closing an opening formed through the bodywork of a vehicle, the device comprising a fixed panel and a panel that constitutes a moving panel relative to the fixed panel, the moving panel being connected to the fixed panel by functional elements providing the required mobility, wherein the functional elements are fitted to the face of the fixed panel that is directed towards the inside of the vehicle.

The device for closing the opening does not possess any outside frame projecting from the bodywork, unlike present devices comprising two-portion panels, i.e. panes including a portion that is movable relative to a fixed portion to ventilate or air a vehicle cabin or compartment.

One of the ways in which the functional elements can be fixed to the inside face of the panel is by means of adhesive. It is also possible to use fastening means that pass through the portion situated on the outside of the panel and which can be covered by a relatively flat mask.

The fixed panel may include an opening having a closed outline and itself closed by the moving panel. In a cheaper variant embodiment, the fixed panel may be built up from a plurality of parts about an opening, with the junction zones between the parts being masked by flush linking section members and by patterns placed on said parts, e.g. by silk-screen printing. The functional elements may also co-operate in assembling the component parts of the fixed panel.

In a variant embodiment, the inside face of the fixed panel, i.e. its face on the inside of the vehicle, includes a frame secured by adhesive and at a distance from the edge of the panel. This makes it possible to receive the fixed panel in a setback relative to the outside surface of the bodywork, with the edges of the opening in the bodywork being located therein, the stuck-on frame penetrating into the inside of the vehicle and forming a support for any appropriate means for coupling the fixed panel, e.g. a backing frame or fixing flanges.

In a second embodiment, the fixed panel is merely stuck to the setback edges of the opening in the bodywork.

In this case in particular, if the functional elements include at least one cross-member, the cross-member extends to the edges of the panel so that the ends of the cross-member are sandwiched between the panel and the edges of the opening in the bodywork. This disposition serves to satisfy certain standards requirements relating to breakage of vehicle glass.

The moving panel which constitutes the element enabling the desired ventilation to be performed may be pivotally or slidably mounted. With a pivotally-mounted element, the cross-member constitutes the fixed portion of a longitudinally hinge whose moving element carries the moving panel by adhesive running along the edge of said panel.

For a sliding ventilation panel, the functional elements include two parallel cross-members supporting guide rails for the panel, the rails optionally being shaped so as to enable the moving panel to perform swinging movement relative to the fixed panel.

BRIEF DESCRIPTION OF THE DRAWING

Other characteristics and advantages of the invention appear from the following description of various embodiments.

Reference is made to the accompanying drawing, in which.

MORE DETAILED DESCRIPTION

In the figures, reference 1 corresponds to a panel of the bodywork of a vehicle in which an opening 2 is formed. The edges of the opening are set back slightly relative to the outside surface of the bodywork so as to be capable of receiving a closure panel which comes flush with the outside surface of the bodywork panel 1. These edges are given reference 3 in the figures.

Figure 1:
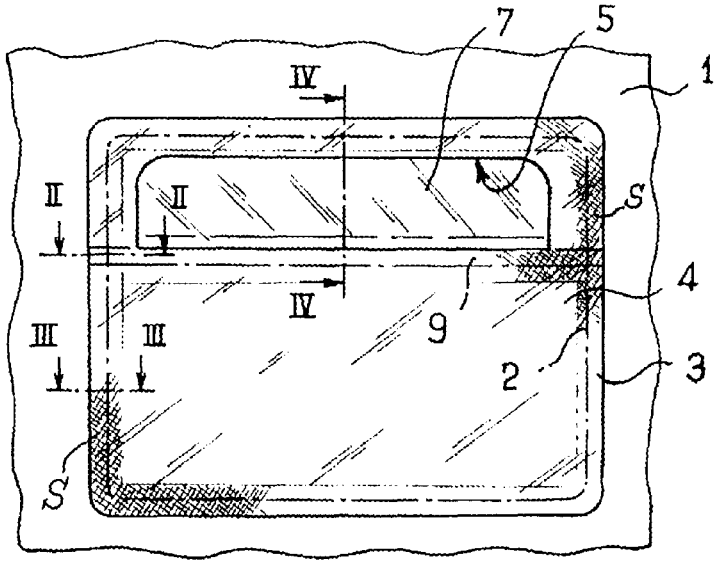
FIG. 1 is a face view of a first embodiment of the device of the invention.
Figure 2:
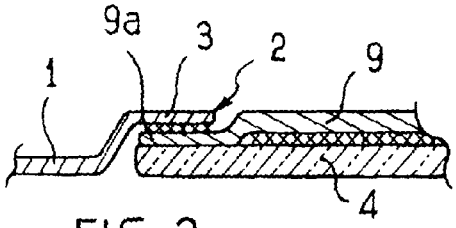
FIG. 2 is a section on plane II—II of FIG. 1.
Figure 3:
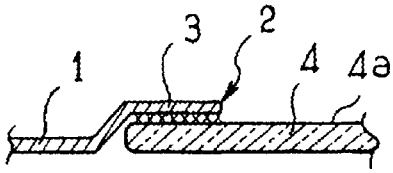
FIG. 3 is a section view on plane III—III of FIG. 1.
Figure 6:
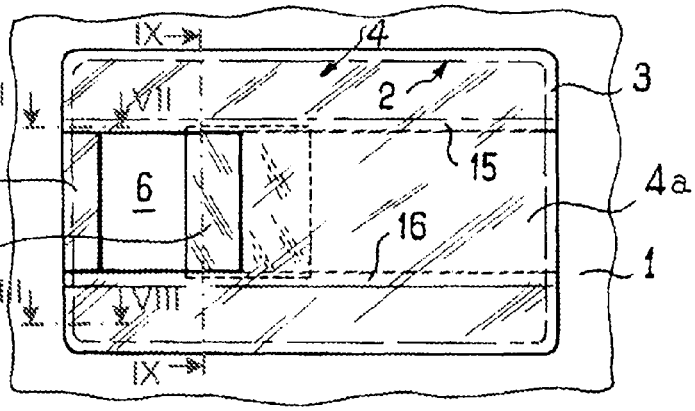
FIG. 6 is an overall view of a fourth embodiment of the invention.

The opening is closed by a panel 4 received in the hollows whose bottoms are formed by the edges 3 of the opening 2 and the panel is stuck via its periphery to said edges 3. The panel 4 is cut so as to include an opening 5 (FIG. 1) or 6 (FIG. 6) suitable for being closed by a moving secondary panel 7 (FIG. 1) or 8 (FIG. 6). The panel 7 of FIG. 1 is hinged by means of a cross-member 9 which is itself stuck to the inside face of the panel 4, e.g. in the immediate vicinity of the edge of the opening 5. One of the features of the embodiment shown is that this cross-member 9 extends to beneath the edge of the panel which is stuck to the edge 3 of the bodywork opening 2. Thus, as shown in FIG. 2, each end 9a of the cross-member 9 is sandwiched between the edge 3 and the panel 4.

Figure 4:
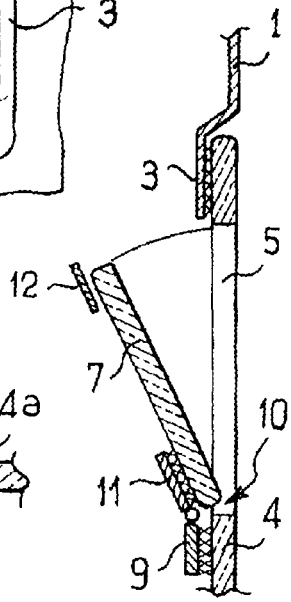
FIG. 4 is a section view of a second embodiment of the invention.

FIG. 4 illustrates the fact that the cross-member 9 is in fact one-half of a hinge 10 whose pivot axis extends parallel to the longer edge of the opening 5, the other half 11 of the hinge 10 forming a support for the panel 7. The panel 7 is stuck to the half 11 in a zone adjacent to the bottom edge of the panel. The top edge of the panel may include an abutment 12 for co-operating with the bodywork or with the top portion of the panel 4 to hold the panel 7 in its closed position and to make the opening waterproof by elements that are not shown.

Figure 5:
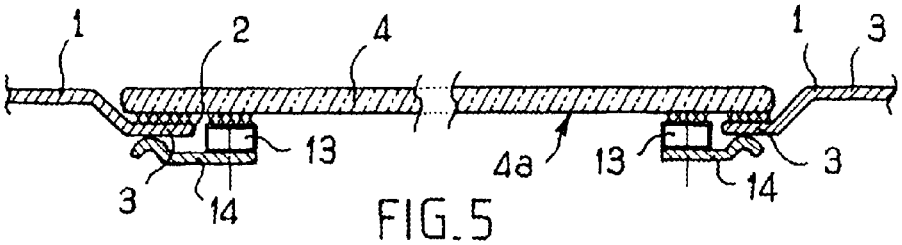
FIG. 5 is a sectional view of a third embodiment of the invention.

Most of the elements described above are included with the same references in the variant embodiment shown in FIG. 5. In this case the panel 4 has a frame 13 on its inside face 4a forming a closed structure inside the panel and offset from the peripheral edge of the panel by a distance that is sufficient to ensure that the panel can be put into place by means of adhesive engaging the edges 31 of the opening 2 in the bodywork. The frame 3 may constitute the support for various accessories, in particular for fixing the panel to the bodywork, e.g. by means of clamps 14. It would be observed in FIG. 1 that in order to mask the zones of adhesive, the fixed panel 4 includes silkscreened patterns around its periphery and over the cross-member 9. Such printing, which is known per se for vehicle windows, also serves to mask the caps covering the heads of the screws or rivets that may have been used for fixing the cross-member 9 to the panel 4 either instead of adhesive or in association with adhesive.

Finally, in FIG. 6 it can be seen that the panel 4 is made up of a plurality of portions (in this case two portions 4a and 4b which define an opening 6 (the portion 4a possessing three sides of the opening and the portion 4b possessing the fourth side thereof). The panels are connected together by any appropriate means disposed on the inside face and optionally co-operating with a frame and the functional cross-members for connecting the moving panel. The junction zones between the parts forming the fixed panel lie in the silkscreen printed zones. In this figure, the panel 8, which is to close the opening 6 formed in the panel 4, is slidably mounted between two cross-members 15 and 16, with the ends of the cross-members 15 and 16 optionally being disposed like the end 9a of the cross-member 9 shown in FIG. 2. In this case, the cross-members 15 and 16 are represented in simplified form and the panel 8 slides in a plane which is different from that of the panel 4, on the inside thereof. It would not go beyond the ambit of the invention to provide in conventional manner for the slides 15 and 16 to be fitted with ramps so as to enable the panel 8 to perform swinging motion over the opening 6 so as to enable it to be placed in the same plane as the panel 4.

*As best shown in FIG. 6, the fixed panel 8 defines a device opening 6 therein. The device opening 6 has an upper opening edge, a lower opening edge, and side opening edges extending between the upper opening edge and the lower opening edge. The upper opening edge of the device opening 6 is spaced downward from the top circumferential edge of the fixed panel 8. The lower opening edge of the device opening 6 is spaced upward from the bottom circumferential edge of the fixed panel 8. Each of the side opening edges of the device opening 6 are spaced toward a center of the fixed panel 8 from the side circumferential edges of the fixed panel 8.*

*The slide supports 15, 16 are disposed on the fixed panel 4, with the slide supports 15, 16 being fitted to a face of the fixed panel 4 that is directed towards the inside of the vehicle. As shown in FIG. 6, the upper slide support 15 is spaced downward from the top circumferential edge of the fixed panel 4 such that the upper slide support 15 is adjacent the upper opening edge of the device opening 6. The lower slide support 16 is spaced upward from the bottom circumferential edge of the fixed panel 8 such that the lower slide support 16 is adjacent the lower opening edge of the device opening 6.*

*The exact construction of the ramps to enable panel 8 to be in plane with panel 4 when in the closed position is conventional and not part of the present invention. In the identical manner as shown in FIG. 2, the ends of the slide 15 extend to the circumferential edges of the fixed panel 4 and are sandwiched between the edge 3 and the panel 4. The ends of the slide 16 are similarly sandwiched between the edge 3 and the panel 4. At the circumferential edges of the fixed panel 4, the ends of the slides 15, 16 are covered by the layer of adhesive, so that the ends of the slides 15, 16 are adhesively sandwiched between the fixed panel 4 and the body of the vehicle.*

In preferred manner, the panels 4, 7, and 8 are glass panels, which glass panels, in spite of the fact that they are fitted with moving elements for enabling the vehicle cabin to be ventilated, are nevertheless flush relative to the bodywork of the vehicle. The advantage in the appearance of such a disposition is due to the lack of any discontinuity, at least any visual discontinuity, between the bodywork and the glass.

It would not go beyond the ambit of the invention to provide for the elements of the panel 4 (when it comprises a plurality of parts) to be made of some material other than glass. A fixed panel of the invention must behave like a one-piece element for fitting to the bodywork of the vehicle, which element may be built up of a plurality of preassembled parts and carrying a moving panel together with functional elements linking it therewith.

I claim:

1. A movable window apparatus for a vehicle having a low profile with respect to an outer body surface of said vehicle, wherein visual discontinuity between the window and the body of said vehicle is substantially eliminated, said movable window apparatus comprising:

means defining [an] *a body* opening in an outside surface of a body of a vehicle for insertion of a window device;

[a movable closure panel disposed within said window device that is movable between open and closed positions;]

a *frameless* fixed panel making up a portion of said window device and disposed in said *body* opening, said fixed panel having *unframed* circumferential edges *facing toward the inside of the vehicle* that are set back *toward the inside of the vehicle* relative to said outside surface of said body [to provide a flush surface for said movable closure panel disposed within said window device], *said circumferential edges comprising a top circumferential edge, a bottom circumferential edge, and side circumferential edges extending from the top circumferential edge to the bottom circumferential edge*, said window device presenting a low profile with respect to said outside surface, *the fixed panel defining a device opening therein with an upper opening edge, a lower opening edge, and side opening edges extending between the upper opening edge and the lower opening edge, the upper opening edge being spaced downward from the top circumferential edge, the lower opening edge being spaced upward from the bottom circumferential edge, each of the side opening edges being spaced toward a center of the fixed panel from the side circumferential edges;*

[said fixed panel having] transversely disposed slide supports [for supporting said] *disposed on said fixed panel, said slide supports being fitted to a face of the fixed panel that is directed towards the inside of the vehicle, said slide supports comprising an upper slide support*

*and a lower slide support, the upper slide support being spaced downward from the top circumferential edge of the fixed panel such that the upper slide support is adjacent the upper opening edge, the lower slide support being spaced upward from the bottom circumferential edge of the fixed panel such that the lower slide support is adjacent the lower opening edge, each of the slide supports having ends extending to the circumferential edges of the fixed panel;*

*a* movable closure panel *that is moveable between an open position leaving the device opening uncovered and a closed position covering the device opening, the movable closure panel being supported by the slide supports* for slidable movement between said open and closed positions within said fixed panel, *the set back of the circumferential edges of the fixed panel providing a flush surface for the movable closure panel relative to the outside surface of the body of the vehicle when in the closed position*; and attachment means disposed between said fixed panel and said body of said vehicle, said attachment means comprising a layer of adhesive disposed about said *unframed* circumferential edges between said fixed panel and said body of said vehicle, *said ends of the slide supports at the circumferential edges of said fixed panel being covered by said layer of adhesive, so that said ends are adhesively sandwiched in a direction transverse to the fixed panel between said fixed panel and said body of said vehicle.*

2. A movable window apparatus for a vehicle having a low profile with respect to an outer body surface of said vehicle, wherein visual discontinuity between the window and the body of said vehicle is substantially eliminated, said movable window apparatus comprising:

means defining an opening in an outside surface of a body of a vehicle for insertion of a window device;

a movable closure panel disposed within said window device that is movable between an open and a closed position;

a *frameless* fixed panel making up a portion of said window device and disposed in said opening, said fixed panel having *unframed* circumferential edges that are set back relative to said outside surface of said body to provide a flush surface for said movable closure panel disposed within said window device, said window device presenting a low profile with respect to said outside surface, said fixed panel having a transversely disposed cross-member for supporting said movable closure panel for articulate movement between said open and closed position within said fixed panel; and attachment means disposed between said fixed panel and said body of said vehicle, said attachment means comprising a layer of adhesive disposed about said *unframed* circumferential edges between said fixed panel and said body of said vehicle.

3. The movable window apparatus for a vehicle in accordance with claim 2, further comprising masking means disposed adjacent said cross-member and about said periphery of said fixed panel, for covering caps and fasteners used to install said fixed panel to the body of said vehicle.

4. The movable window apparatus for a vehicle in accordance with claim [2] *3*, wherein said masking means comprises a silkscreened pattern.

*5. The movable window apparatus for a vehicle according to claim 1, further comprising masking means disposed adjacent to said slide supports and about said circumferential edges of said fixed panel.*

*6. The movable window apparatus for a vehicle according to claim 5, wherein said masking means comprises a silk-screened pattern.*

*7. The movable window apparatus for a vehicle according to claim 1, wherein said ends of the slide supports have a reduced thickness.*

*8. The movable window apparatus for a vehicle according to claim 1, wherein said fixed panel and said movable closure panel are glass panels.*

*9. The movable window apparatus for a vehicle according to claim 1, wherein said fixed panel is a one-piece element.*

*10. The movable window apparatus for a vehicle according to claim 1, wherein said fixed panel is built up of a plurality of preassembled parts.*

*11. The movable window apparatus for a vehicle according to claim 10, wherein said slide supports cooperate in assembling said preassembled parts of the fixed panel.*

*12. The movable window apparatus for a vehicle according to claim 1, wherein said slide supports are stuck with adhesive to the inside face of said fixed panel.*

*13. A movable window device for a vehicle having a low profile with respect to an outer body surface of said vehicle, wherein visual discontinuity between the window and the body of said vehicle is substantially eliminated, wherein said movable window device is defined to be mounted in an opening of an outside surface of a body of said vehicle, and wherein said movable device comprises:*

*a mobile panel disposed within said window device that is movable between open and closed positions;*

*a frameless fixed panel making up a portion of said window device and to be disposed in said opening, said frameless fixed panel having its unframed periphery set back relative to said outside surface of said body to provide a flush surface for said mobile panel disposed within said window device, said window device presenting a low profile with respect to said outside surface,*

*said fixed panel having transversely disposed sliding supports for supporting said mobile panel for slidable movement between said open and closed positions within said fixed panel, said sliding supports comprising extensions extending to the periphery of said fixed panel; and*

*attachment means to be disposed between said fixed panel and said body of said vehicle, said attachment means comprising a layer of adhesive to be disposed about said periphery between said fixed panel and said body of said vehicle, so that said extensions are sandwiched in a direction transverse to the fixed panel between said fixed panel and said body.*

*14. The movable window device for vehicle according to claim 13, further comprising masking means disposed adjacent to said sliding supports and about said periphery of said fixed panel.*

*15. The movable window device for vehicle according to claim 14, wherein said masking means comprises a silk-screened pattern.*

*16. The movable window device for vehicle according to claim 13, wherein said extensions end in a reduced thickness.*

*17. The movable window device for vehicle according to claim 13, wherein said fixed panel and said mobile panel are glass panels.*

*18. The movable window device for vehicle according to claim 13, wherein said fixed panel is a one-piece element.*

*19. The movable window device for vehicle according to claim 13, wherein said fixed panel is built up of a plurality of preassembled parts.*

*20. The movable window device for vehicle according to claim 19, wherein said sliding supports cooperate in assembling said preassembled parts of the fixed panel.*

*21. The movable window device for vehicle according to claim 13, wherein said sliding supports are stuck with adhesive to the inside face of said fixed panel.*

*22. A movable window device for a vehicle, to be inserted in a body opening in a body of the vehicle, designed to present a low profile with respect to an outer body surface of said vehicle, wherein visual discontinuity between the window and the body of said vehicle is substantially eliminated, said movable window device comprising:*

*a frameless fixed panel making up a portion of said window device and to be disposed in said body opening, said fixed panel having unframed circumferential edges, comprising a top circumferential edge, a bottom circumferential edge, and side circumferential edges extending from the top circumferential edge to the bottom circumferential edge, the fixed panel defining a device opening therein with an upper opening edge, a lower opening edge, and side opening edges extending between the upper opening edge and the lower opening edge, the upper opening edge being spaced downward from the top circumferential edge, the lower opening edge being spaced upward from the bottom circumferential edge, each of the side opening edges being spaced toward a center of the fixed panel from the side circumferential edges;*

*transversely disposed slide supports disposed on said fixed panel, said slide supports being fitted to a face of the fixed panel that is directed towards the inside of the vehicle, said slide supports comprising an upper slide support and a lower slide support, the upper slide support being spaced downward from the top circumferential edge of the fixed panel such that the upper slide support is adjacent the upper opening edge, the lower slide support being spaced upward from the bottom circumferential edge of the fixed panel such that the lower slide support is adjacent the lower opening edge, each of the slide supports extending to circumferential edges of the fixed panel, on the face of the fixed panel that is directed towards the inside of the vehicle, so that said ends are adhesively sandwiched in a direction transverse to the fixed panel between said fixed panel and said body of said vehicle with attachment means disposed between said fixed panel and body of said vehicle, said attachment means comprising a layer of adhesive disposed about said circumferential edges between said fixed panel and said set back edges of the body of said vehicle, said ends of the slide supports at the circumferential edges of said fixed panel being covered by said layer of adhesive; and*

*a movable closure panel that is moveable between an open position leaving the device opening uncovered and a closed position covering the device opening, the movable closure panel being supported by the slide supports for slidable movement between said open and closed positions within said fixed panel, the slide supports providing for swinging motion of the movable closure panel over the device opening, so as to provide a flush surface for the movable closure panel relative to the fixed panel.*

* * * * *